United States Patent
Hartwich et al.

(10) Patent No.: US 12,508,211 B2
(45) Date of Patent: Dec. 30, 2025

(54) SILICONE-FREE BIPHASIC HAIR RESTORATIVE

(71) Applicant: Henkel AG & Co. KGaA, Duesseldorf (DE)

(72) Inventors: Christa Hartwich, Elmshorn (DE); Christin Von Borstel, Drochtersen (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 1185 days.

(21) Appl. No.: 17/414,903

(22) PCT Filed: Nov. 12, 2019

(86) PCT No.: PCT/EP2019/080933
§ 371 (c)(1),
(2) Date: Jun. 16, 2021

(87) PCT Pub. No.: WO2020/126219
PCT Pub. Date: Jun. 25, 2020

(65) Prior Publication Data
US 2022/0062120 A1    Mar. 3, 2022

(30) Foreign Application Priority Data
Dec. 17, 2018  (DE) .................. 10 2018 221 949.4

(51) Int. Cl.
| | | |
|---|---|---|
| A61K 8/03 | (2006.01) | |
| A61K 8/31 | (2006.01) | |
| A61K 8/37 | (2006.01) | |
| A61K 8/85 | (2006.01) | |
| A61K 8/92 | (2006.01) | |
| A61Q 5/12 | (2006.01) | |

(52) U.S. Cl.
CPC .................. *A61K 8/03* (2013.01); *A61K 8/31* (2013.01); *A61K 8/37* (2013.01); *A61K 8/85* (2013.01); *A61K 8/922* (2013.01); *A61Q 5/12* (2013.01); *A61K 2800/34* (2013.01); *A61K 2800/5426* (2013.01)

(58) Field of Classification Search
None
See application file for complete search history.

(56) References Cited

U.S. PATENT DOCUMENTS

| | | |
|---|---|---|
| 10,016,348 B2 | 7/2018 | Charbit |
| 2004/0241200 A1 | 12/2004 | Winn et al. |
| 2009/0041703 A1* | 2/2009 | Molenda ............ A61K 8/03 424/70.28 |

FOREIGN PATENT DOCUMENTS

| | | |
|---|---|---|
| FR | 2971421 A1 | 1/2017 |
| FR | 3038514 A1 | 1/2017 |
| WO | 2004103308 A2 | 12/2004 |
| WO | 2010069995 A1 | 6/2010 |

OTHER PUBLICATIONS

UL Prospector "Pelemol® 168" <https://www.ulprospector.com/en/na/PersonalCare/Detail/1267/330769/PELEMOL-168> (Year: 2015).*
EPO, International Search Report issued in International Application No. PCT/EP2019/080933, dated Jan. 9, 2020.

* cited by examiner

Primary Examiner — Nicole P Babson
(74) Attorney, Agent, or Firm — Ingrassia Fisher & Lorenz, LLP

(57) ABSTRACT

A hair treatment composition is in the form of a two-phase system having two separate, optically detectable continuous phases with a common horizontal phase boundary, and comprises a water phase (I) and an oil phase (II), wherein the oil phase (II) is a mixture of: i) at least one isoparaffin having 9 to 17 carbon atoms, ii) at least two different mono- and/or diesters of linear or branched, saturated or unsaturated $C_4$-$C_{12}$ carboxylic acids with linear or branched, saturated or unsaturated $C_4$-$C_{24}$ mono- or dialcohols, and iii) at least one vegetable oil, and wherein the hair treatment composition is essentially free of silicone compounds.

17 Claims, No Drawings

SILICONE-FREE BIPHASIC HAIR RESTORATIVE

CROSS-REFERENCE TO RELATED APPLICATION

This application is a U.S. National-Stage entry under 35 U.S.C. § 371 based on International Application No. PCT/EP2019/080933, filed Nov. 12, 2019, which was published under PCT Article 21(2) and which claims priority to German Application No. 10 2018 221 949.4, filed Dec. 17, 2018, which are all hereby incorporated in their entirety by reference.

TECHNICAL FIELD

The application describes hair treatment compositions in the form of a two-phase system with an oil phase and a water phase in the form of two separate, visually recognizable continuous phases with a common horizontal phase boundary, which are essentially free of silicones and which have a high proportion of isoparaffins with 9 to 17 carbon atoms in the oil phase.

BACKGROUND

The application further describes a method of conditioning hair using the hair treatment compositions and the use of the hair treatment compositions to improve specific conditioning properties of hair.

Two-phase hair conditioners have long been known from the state of the art and are highly appreciated by consumers due to their attractive appearance.

Typically, these are leave-on products that are preferably applied to the hair (preferably sprayed) immediately after the two phases have been mixed for a short time to condition the hair.

In the oil phase, most of these products contain cyclic silicones.

However, from an ecological point of view, as well as for reasons of greater consumer acceptance, there is a need for hair treatment products that are as silicone-free as possible and provide good care.

In the past, corresponding products have already been proposed in which (cyclic) silicones have been partially or completely replaced by other fatty phase components: WO 2010/069995 describes two-phase products with a high polyol content in the water phase, which contain at least 5% by weight of a non-silicone oil (for example kerosenes and/or isoparaffins) in the oil phase.

As a substitute for cyclic silicones in cosmetic skin treatment products, a mixture of isododecane and a specific ester was proposed in WO 2004/103308, and it was stated that the volatility and spread ability of this mixture was approximately the same as that of cyclic silicones.

Nevertheless, there is need for improvement about several hair care aspects. In addition, consumers prefer well-maintained compositions that are low in complexity, have a high proportion of renewable raw materials and the highest possible water content.

BRIEF SUMMARY

A hair treatment composition is provided in the form of a two-phase system having two separate, optically detectable continuous phases with a common horizontal phase boundary, and comprises a water phase (I) and an oil phase (II), wherein the oil phase (II) is a mixture of: i) at least one isoparaffin having 9 to 17 carbon atoms, ii) at least two different mono- and/or diesters of linear or branched, saturated or unsaturated $C_4$-$C_{12}$ carboxylic acids with linear or branched, saturated or unsaturated $C_4$-$C_{24}$ mono- or dialcohols, and iii) at least one vegetable oil, and wherein the hair treatment composition is essentially free of silicone compounds.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

The present application was based on the task of providing essentially silicone-free hair treatment agents in the form of two-phase systems with high care performance that ensure an optimum balance between long-lasting and sustainable care and good compatibility.

The hair treatment products should have as high a water content as possible while maintaining the same care performance and restore softness, shine, and suppleness as well as improved detangling and combability to previously damaged and/or dry and/or split ends.

Another goal was to provide two-phase hair treatment products that do not weigh down the hair even after regular use and make the hair easier to shape and style.

It was found that by combining special isoparaffins, esters, and vegetable oils in the oil phase and by having a high-water content in the water phase, it is possible to provide two-phase hair treatment agents that meet the requirements to a high degree.

The presence of (cyclic) silicones is not necessary for either the stability or the care properties of such hair treatment products, because the hair treatment products are present in the form of temperature- and storage-stable two-phase systems with continuous oil and continuous water phases, whereby the phases can be mixed and unmixed quickly and thoroughly.

In addition, the hair treatment agents exhibit a demonstrable conditioning benefit on hair treated with them. Combability, hair shine, and styling properties, especially of previously stressed and/or damaged hair, were significantly improved. But the "anti-frizz" effect of such hair treatment products was also given an excellent rating in a consumer test.

Hair treated with agents as contemplated herein had an overall healthier visual appearance.

A first object of the present disclosure is a hair treatment composition in the form of a two-phase system having two separate, optically detectable, continuous phases with a common horizontal phase boundary, comprising a water phase (I) and an oil phase (II), wherein
  the oil phase (II) is a mixture of
  i) at least one isoparaffin containing 9 to 17 carbon atoms,
  ii) at least two different mono- and/or diesters of linear or branched, saturated or unsaturated $C_4$-$C_{12}$ carboxylic acids with linear or branched, saturated or unsaturated $C_4$-$C_{24}$ mono- or dialcohols, and
  iii) contains at least one vegetable oil, and
  the hair treatment products are essentially free of silicone compounds.

The hair treatment compositions as contemplated herein comprise two optically separate phases which can be homogenized by shaking, and which separate again at rest into two separate, optically detectable continuous phases with a common horizontal phase boundary.

Optimally, the hair treatment compositions as contemplated herein optically return to their initial state with horizontal phase boundary within ten hours, preferably within seven hours, particularly preferably within five hours, most preferably within three hours and especially within one hour.

For rapid mixing and demixing of the two phases, it can be advantageous if the water phase (I) and the oil phase (II) have lower viscosity values. In the context of the present disclosure, "lower viscosity values" preferably means viscosity values of the water phase (I) and the oil phase (II) of up to a maximum of 1000 mPas in each case, more preferably 600 mPas and 400 mPas (measured at 20° C. with a Brookfield viscometer DV-II, spindle 2 at 20 rpm).

For better visibility of the mixing and demixing of the two phases, it can be further advantageous if the water phase (I) is transparent.

Under this condition, sufficient mixing of the two phases can preferably be recognized by the fact that only a single phase is still visible, which can be opaque to milky cloudy.

In particular, at least one of the two phases (I) and (II) is preferably transparent.

In the context of the present disclosure, "transparency" is understood to mean that the water phase (1) and/or the oil phase (II) in the quiescent state preferably have an NTU (Nephelometric Turbidity Unit) value of at most 100, preferably at most 75, more preferably at most 50, and at most 25 (measured, for example, with a turbidimeter of the Turbiquant® type from the company Merck).

In a preferred embodiment, the water phase (I) is transparent and the oil phase (II) of the care phase is milky-creamy.

Also, for better visualization, one of the two phases (I) or (II), preferably the water phase (I), may be colored with a cosmetically acceptable dye.

It is further desirable and preferred that the hair treatment compositions of the present disclosure are sprayable.

In sprayable form, the hair treatment compositions of the present disclosure are suitable for application from a pump dispenser. The advantage of such a form of application is its simple, clean, and time-saving manageability, because the hair treatment agents can be distributed from a suitable pump dispenser as a fine spray by simply operating a pump valve and reach all areas of the hair.

In this way, the hands do not meet the agent and do not need to be cleaned after applying the agent.

For such a form of application, the ready-to-use hair treatment compositions (i.e., those homogenized by shaking) as contemplated herein preferably have a viscosity of not more than 1000 mPas, preferably of not more than 800 mPas, more preferably of not more than 600 mPas and of not more than 500 mPas (in each case measured at 20° C. with a Brookfield viscometer DV-II, spindle 2 at 20 rpm).

Also preferred for such a form of application is that the hair conditioners as contemplated herein are free of propellants.

In the context of the present disclosure, "substantially free of silicone compounds" is understood to mean that no free silicone compounds are added to the hair treatment compositions.

If any optional commercial products contained in the hair treatment compositions comprise small amounts of silicone compounds, "essentially free of silicone compounds" is to be understood to mean that the hair treatment compositions (based on their total weight) preferably contain a maximum of 0.01% by weight, more preferably a maximum of 0.005% by weight and particularly preferably a maximum of 0.001% by weight of silicone compounds.

Very preferably, only commercial products that do not contain silicone compounds are used in the hair treatment products.

In a preferred embodiment, the hair treatment compositions as contemplated herein comprise:
a) the water phase (I) in a proportion by weight of at least 80%, preferably at least 85% and in particular at least 88% of the total weight of the hair treatment composition, and
b) the oil phase (II) in a proportion by weight of not more than 20%, preferably of not more than 15% and of not more than 12% by weight of the total weight of the hair treatment composition.

It is further preferred in the context of the present disclosure that the water phase (I) contains—based on its total weight—at least 85% by weight, preferably at least 90% by weight, and in particular at least 95% by weight of water.

According to a further preferred embodiment, the oil phase (II) contains, based on its total weight,
from about 20 to about 40% by weight of isoparaffin(s) i),
from about 45 to about 65% by weight of at least two different mono- and/or diesters ii), and
from about 5 to about 20% by weight of at least one vegetable oil.

It was found that particularly medium chain isoparaffins i) can be readily incorporated into two-phase hair care compositions as contemplated herein.

Compared with silicones in corresponding two-phase hair care products, medium chain isoparaffins i) exhibit a hair care effect that is roughly equivalent.

Isoparaffins with 9 to 17 carbon atoms i) are suitable as silicone substitutes in hair care products due to their ability to impart shine and softness to the hair without causing weightiness or regreasing of the hair when used regularly.

Suitable medium chain isoparaffins i) are preferably understood to mean isoparaffins containing 9 to 17 carbon atoms, such as isodecane, isoundecane, isododecane, isotridecane, isotetradecane, and mixtures of these isoparaffins.

Individual ones of these isoparaffins or mixtures of two or more isoparaffins can be used. The use of isoparaffins from the group consisting of isoundecane, isododecane and isotridecane has proven to be particularly advantageous for the cosmetic effect in the hair treatment compositions of the present disclosure.

In a further preferred embodiment, the hair treatment compositions as contemplated herein contain as isoparaffin i) isodecane, isoundecane, isododecane, isotridecane, isotetradecane, and mixtures thereof.

Particularly preferred within this embodiment are hair treatment compositions as contemplated herein which contain isoundecane, isododecane, and/or isotridecane.

The proportion by weight of isoundecane, isododecane, and isotridecane in the total weight of all isoparaffins i) used in the oil phase (II) is preferably >60% by weight, more preferably >70% by weight, particularly preferably >80% by weight, and especially preferably >90% by weight.

Examples of particularly suitable isoparaffins i) are the commercially available products Purolan® IDD (INCI designation: Isododecane), Pioneer® 2094, and KC Solvent® 130 (INCI designation:isoundecane, isododecane).

Suitable isoparaffins i) can also be used in the oil phase (II) of the compositions as contemplated herein as a mixture with one or more ester(s) ii), for example as the commercial product Lexfeel® D5 available from the company Inolex (INCI designation: Neopentyl Glycol Diheptanoate, Isododecane).

The isoparaffin(s) i) can preferably be used in the oil phase (II) of the hair treatment compositions as contemplated herein in a proportion by weight of from about 20 to about 40% (more preferably from about 22 to about 38%, particularly preferably from about 25 to about 35%, and especially from about 27 to about 33%) of the total weight of the oil phase (II) in each case.

To increase the conditioning effect, the hair treatment compositions as contemplated herein further contain at least two different mono- and/or diesters ii) of linear or branched, saturated or unsaturated $C_4$-$C_{12}$ carboxylic acids with linear or branched, saturated or unsaturated $C_4$-$C_{12}$ mono- or dialcohols.

Suitable esters ii) must mix well with the isoparaffins i) and the at least one vegetable oil iii) and, as a mixture, exhibit excellent spread ability and efficacy on the hair without weighing it down.

It was found that mixtures of branched esters ii) are particularly suitable for this purpose.

In a further preferred embodiment, hair treatment compositions as contemplated herein therefore contain at least two different branched esters ii), wherein the branching may be in the alcohol residue or in the acid residue.

Preferred branched esters ii) may be selected from compounds of formula (I).

$$CH_3\text{—}(CH_2)_m\text{—}(CHR^1)_n\text{—}COO\text{—}R^2 \qquad (I)$$

wherein
- $R^1$ is a straight-chain or branched, saturated or unsaturated, $C_1$-$C_8$ alkyl group,
- m is a number from 3 to 11,
- n is a number from 0 to 3, and
- $R^2$ may represent a straight or branched, saturated or unsaturated, $C_1$-$C_{24}$ alkyl group, which may contain in the chain one or more —OC(O)—, —NHC(O)—, or —C(OH)— groups.

In more preferred esters ii) of the above formula (I) is
- $R^1$ is a straight-chain $C_1$-$C_4$ alkyl radical, very preferably a methyl or an ethyl radical,
- m is a number from 3 to 6,
- n is 0 or 1, and
- $R^2$ is a straight-chain, saturated $C_1$-$C_{18}$-alkyl group or a branched, saturated $C_1$-$C_{18}$-alkyl group containing one or more —OC(O)— groups in the chain.

Particularly preferably, the hair treatment compositions as contemplated herein contain mixtures of at least one ester ii) of the formula (Ia) and at least one ester ii) (Ib):

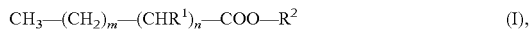

$$CH_3\text{—}(CH_2)_m\text{—}(CHR^1)_n\text{—}COO\text{—}(CH_2)_o\text{—}CH_3 \qquad (Ia)$$

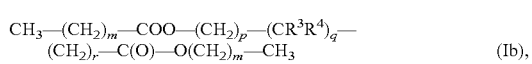

$$CH_3\text{—}(CH_2)_m\text{—}COO\text{—}(CH_2)_p\text{—}(CR^3R^4)_q\text{—}(CH_2)_r\text{—}C(O)\text{—}O(CH_2)_m\text{—}CH_3 \qquad (Ib)$$

wherein
- m, n and $R^1$ have the same meaning as above, preferably in which m is the number 3, 4 or 5; n is the number 1, and $R^1$ is a methyl or ethyl radical,
- o represents a number from 7 to 19, preferably from 9 to 17,
- p and r independently of one another represent the numbers 0, 1, 2, or 3, preferably the number 1 or 2,
- q represents the numbers 0, 1, 2, or 3, preferably the number 1, and
- $R^3$, $R^4$ independently of one another represent a $C_1$-$C_4$ alkyl radical, preferably a methyl radical.

Very particularly preferred esters according to formula (Ia) are esters of crosslinked $C_5$-$C_8$ carboxylic acids and $C_{12}$-$C_{24}$ monoalcohols, preferably esters of 2-ethylhexylcarboxylic acid and myristyl, cetyl and/or stearyl alcohol and esters known under the INCI designation cetyl ethylhexanoate.

Very particularly preferred esters according to formula (Ib) are neopentyl polyol esters, preferably neopentyl glycol esters, and in particular esters known under the INCI designation neopentyl glycol diheptanoate.

Esters ii), preferably esters according to formula (Ib), more preferably neopentyl polyol esters, particularly preferably neopentyl glycol esters and especially neopentyl glycol diheptanoates can be added to the oil phase (II) of the hair treatment compositions as contemplated herein individually or as a mixture with one or more oil components (Ia) or iii).

Furthermore, it is possible to use esters according to formula (Ib), preferably neopentyl polyol esters, particularly preferably neopentyl glycol esters and especially neopentyl glycol diheptanoates as a mixture with isoparaffin i) in the oil phase (II) of the hair treatment compositions as contemplated herein.

Such mixtures are known and offered as commercial products, for example under the name Lexfeel®D5 by the company Inolex.

In a further preferred embodiment, hair treatment compositions as contemplated herein contain in the oil phase (II), as esters ii)
- at least one neopentyl polyol polyester, preferably a neopentyl glycol diester, and
- at least one ester of a crosslinked $C_5$-$C_8$ carboxylic acid and a $C_{12}$-$C_{24}$ monoalcohol, preferably esters of 2-ethylhexyl carboxylic acid and myristyl, cetyl and/or stearyl alcohol.

Within this embodiment, hair treatment compositions as contemplated herein are particularly preferred which, in the oil phase (II) as ester ii)
- at least one ester known under the INCI name Cetyl Ethylhexanoate, and
- contain at least one ester known under the INCI designation neopentyl glycol diheptanoate.

The esters ii), preferably branched esters ii) according to formula (I) and a mixture of esters (Ia) and (Ib) can preferably be used in the oil phase (II) of the hair treatment compositions as contemplated herein in a proportion by weight of about 45 to about 65% by weight in each case (more preferably from about 48 to about 63% by weight, particularly preferably from about 50 to about 61% by weight and about 52 to about 60% by weight) of the total weight of the oil phase (II).

Of advantage are ester mixtures ii), preferably mixtures of at least one ester of the formula (Ia) and at least one ester of the formula (Ib), in which the weight ratio of esters of the formula (Ia) to esters of the formula (Ib) is in the range of about 1:10 to about 1:2, preferably from about 1:8 to about 1:3, and in particular of about 1:7 to about 1:5.

In addition to the two different esters ii), the hair treatment compositions as contemplated herein may optionally contain further esters if these do not negatively affect the stability and care properties of the compositions.

Suitable further esters have been found to be, for example, symmetrical, asymmetrical, or cyclic esters of carbonic acid with fatty alcohols such as dicaprylyl carbonate.

Dicaprylyl carbonate is commercially available from several suppliers, including BASF under the name Cetiol®.

Esters of carbonic acid with fatty alcohols can be used in the compositions as contemplated herein in approximately the same amounts as the esters according to formula (Ia).

As a third essential component in the oil phase (II), the hair treatment compositions as contemplated herein contain at least one vegetable oil. Thus, compositions as contemplated herein can be enriched with ingredients of natural origin that nourish the hair without weighing it down.

Suitable vegetable oils iii) in the context of the present disclosure include amaranth seed oil, apricot kernel oil, argan oil, avocado oil, babassu oil, cottonseed oil, borage seed oil, camelina oil, safflower oil, peanut oil, pomegranate seed oil, grapefruit seed oil, hemp oil, rosehip seed oil, hazelnut oil, elderberry seed oil, blackcurrant seed oil, jojoba oil, cocoa butter, linseed oil, macadamia nut oil, corn oil, almond oil, marula oil, evening primrose oil, olive oil, palm oil, peach kernel oil, rapeseed oil, rice oil, sea buckthorn fruit oil, sea buckthorn kernel oil, sesame oil, shea butter, soybean oil, sunflower oil, grape seed oil, walnut oil, or wild rose oil.

Particularly suitable are previously mentioned vegetable oils, which, like oils i) and ii), have a particularly good spread ability on the scalp and hair and are quickly and well absorbed into the hair fibers and nourish them. Among the most suitable vegetable oils are those which, like oils from animal sources, contain a particularly high proportion of triglycerides from unsaturated fatty acids such as oleic acid and palmitoleic acid. Examples of very particularly suitable vegetable oils in the sense of the present disclosure are avocado oil, sea buckthorn fruit oil, and/or macadamia nut oil. Macadamia nut oil is particularly preferred.

The at least one vegetable oil iii), preferably avocado oil, sea buckthorn fruit oil, and/or macadamia nut oil, and in particular macadamia nut oil, can preferably be used in the oil phase (II) of the hair treatment compositions as contemplated herein in a proportion by weight of in each case of about 5 to about 20% by weight (more preferably from about 6 to about 17% by weight, particularly preferably from about 7 to about 15% by weight, and about 8 to about 12% by weight) of the total weight of the oil phase (II).

In a very particularly preferred embodiment, hair treatment compositions as contemplated herein contain in the oil phase (II)—based on the total weight of the oil phase.

from about 20 to about 40% by weight, more preferably from about 22 to about 38% by weight, particularly preferably from about 25 to about 35% by weight, and especially about 27 to about 33% by weight of isoundecane, isododecane, and/or isotridecane, from about 10 to about 60% by weight, more preferably from about 15 to about 57.5% by weight, particularly preferably from about 20 to about 55% by weight, and especially about 25 to about 52.5% by weight, of at least one neopentyl glycol diester, compounds known under the INCI designation neopentyl glycol diheptanoate, from about 5 to about 20% by weight, more preferably from about 6 to about 17% by weight, particularly preferably from about 7 to about 15% by weight, and especially about 8 to about 12% by weight, esters of 2-ethylhexylcarboxylic acid and myristyl, cetyl, and/or stearyl alcohol, in particular compounds known under the INCI designation cetyl ethylhexanoate, and from about 5 to about 20% by weight, more preferably from about 6 to about 17% by weight, particularly preferably from about 7 to about 15% by weight, and especially from about 8 to about 12% by weight, of avocado oil, sea buckthorn fruit oil and/or macadamia nut oil, especially macadamia nut oil.

To optimize the care properties of the hair treatment compositions as contemplated herein, it is advantageous if hair care active ingredients are also added to the water phase (I). When selecting these care active ingredients, it must be ensured that they do not negatively affect either the stability of the water phase (I) or the stability of the two-phase product.

Optimally, therefore, only care active ingredients that are readily soluble in the water phase (I) and/or that do not increase the viscosity of the water phase to values outside the previously mentioned limits are used in the water phase (I).

Examples of suitable (care) active ingredients that are advantageously added to the water phase (I) can be selected from cationic surfactants, and/or
cationic polymers, and/or
protein hydrolysates, and/or
Vitamins, and/or
active ingredients for pH regulation.

Furthermore, the water phase may contain preservatives, for example benzoic acid and/or a physiologically acceptable salt of benzoic acid.

In a further preferred embodiment, the hair treatment compositions as contemplated herein contain about 0.01 to about 1.0% by weight of at least one cationic surfactant in the water phase (I), based on the total weight of the water phase (I).

Particularly preferably, the cationic surfactants are used in amounts of about 0.05 to about 0.8% by weight, very preferably of about 0.075 to about 0.6% by weight, and especially of about 0.10 to about 0.5% by weight (based on the total weight of the water phase (I)), because they are intended to enhance the hair care effect but not to contribute to prolonging the emulsification of the oil phase (II) (or to parts of the oil phase).

Suitable cationic surfactants for use in the hair treatment compositions as contemplated herein preferably include linear or branched, saturated or unsaturated, physiologically compatible $C_1$-$C_{24}$-alkyltri($C_1$-$C_4$)-alkylammonium salts, Di-$C_1$-$C_{24}$-alkyldi($C_1$-$C_4$)alkyl ammonium salts or Tri-$C_1$-$C_{24}$-alkyl ($C_1$-$C_4$)alkyl ammonium salts, and/or primary, secondary or tertiary amines containing at least one group R—CO(NH)—(CH$_2$)$_n$— in which R is a linear or branched, saturated or unsaturated, alkyl group containing 7 to 21 carbon atoms and n is an integer of 1 to 4.

Particularly preferred $C_1$-$C_2$-alkyltri($C_1$-$C_4$)-alkylammonium salts, di-$C_1$-$C_{24}$-alkyldi($C_1$-$C_4$)-alkylammonium salts or tri-$C_1$-$C_{24}$-alkyl($C_1$-$C_4$)-alkylammonium salts are, for example, halide and/or methosulfate salts, in particular chlorides, bromides and methosulfates, such as distearyldimethylammonium chloride, lauryltrimethylammonium chloride, lauryltrimethylbenzylammonium chloride, tricetylmethylammonium chloride, cetyltrimethylammonium chloride, cetyltrimethylammonium bromide, cetyltrimethylammonium methosulfate, stearyltrimethylammonium chloride, behenyltrimethylammonium chloride, behenyltrimethylammonium bromide, and behenyltrimethylammonium methosulfate.

Cetyltrimethylammonium and behenyltrimethylammonium salts and cetyltrimethylammonium salts containing a methosulfate ion and/or a chloride ion as anion are quite preferred.

Particularly preferred primary, secondary, or tertiary amines containing at least one group R—CO(NH)—(CH$_2$)$_n$—, in which R is a linear or branched, saturated or unsaturated, alkyl group containing from 7 to 21 carbon atoms, and n is an integer from 1 to 4, are known as "amidoamines".

Suitable amidoamines can be present both as such and (because of protonation in suitably acidic solution) in the form of their respective quaternary compound in the hair conditioning agents.

Preferred are the non-cationic amidoamines.

Particularly suitable amidoamines, which can be quaternized if necessary, are for example Tego Amid® S18 (Evonik; INCI designation: Stearamidopropyl Dimethylamine), Lexamine® S13 (Inolex; INCI designation: Stearamidopropyl Dimethylamine), Incromine® SB (Croda; INCI designation: Stearamidopropyl Dimethylamine), Witcamine® 100 (Witco, INCI designation: Cocamidopropyl Dimethylamine), Incromine® BB (Croda, INCI designation: Behenamidopropyl Dimethylamine). ProCondition®22 (Inolex, INCI designation: Brassicamidopropyl Dimethylamine), Mackine® 401 (McIntyre, INCI designation: Isostearylamidopropyl Dimethylamine), and other Mackine grades as well as Adogen® S18V (Witco, INCI designation: Stearylamidopropyl Dimethylamine).

Examples of permanent cationic amidoamines that can be used are: Rewoquat® RTM 50 (Witco Surfactants GmbH, INCI designation: Ricinoleamidopropyltrimonium Methosulfate), Empigen® CSC (Albright & Wilson, INCI designation: Cocamidopropyltrimonium Chloride), Swanol Lanoquat® DES-50 (Nikko, INCI designation: Quaternium-33), and Rewoquat® UTM 50 (Witco Surfactants GmbH, Undecyleneamidopropyltrimonium Methosulfate).

Stearamidopropyl dimethylamines and/or brassicamidopropyl dimethylamines are particularly preferred.

In a further preferred embodiment, the hair treatment compositions as contemplated herein contain in the water phase (I)—based on the total weight of the water phase (I)—from about 0.01 to about 2.5% by weight of at least one cationic polymer.

Suitable cationic polymers for use in the hair treatment compositions as contemplated herein are preferably understood to be cationic polymers known under the INCI designation "polyquaternium". Particularly suitable cationic polymers are Polyquaternium-6, Polyquaternium-7, Polyquaternium-10, Polyquaternium-11, Polyquaternium-16, Polyquaternium-22, Polyquaternium-24, Polyquaternium-28, Polyquaternium-37, Polyquaternium-67, Polyquaternium-74, and/or Polyquaternium-89.

Cationic polymers derived from polymers of natural origin, such as cellulose, starch, or guar polymers, are particularly suitable.

Cationic cellulose derivatives are offered, for example, by the company Amerchol under the name Polymer JR® and cationic guar polymers by the company Rhône-Poulenc or Hercules under the names Jaguar® or N-Hance®.

Other suitable cationic polymers of natural origin are, for example, cationic chitosans, which are commercially available under the names "Kytamer" or "Hydagen", for example.

Also suitable are the cationic polymers known under the INCI designation "quaternium" such as quaternium-8, quaternium-14, quaternium-15, quatemium-18, quaternium-22, quatemium-24, quatemium-26, Quaternium-27, Quatemium-30, Quatemium-33, Quaternium-53, Quaternium-60, Quaternium-61, Quatemium-72, Quaternium-78, Quatemium-80, Quaternium-81, Quaternium-82, Quaternium-83, and/or Quaternium-84.

Other suitable cationic polymers are, for example,— cationic alkyl polyglycosides,—cationized honey, for example the commercial product Honeyquat® 50,—vinylpyrrolidone-vinylimidazolium methochloride copolymers, such as those offered under the designations Luviquat® FC 370, FC 550, FC 905 and HM 552,—quaternized polyvinyl alcohol,—as well as the polymers known under the designations polyquatemium-2, polyquaternium-17, polyquaternium-18, and polyquaternium-27 with quaternary nitrogen atoms in the polymer main chain,—vinylpyrrolidone-vinylcaprolactam-acrylate terpolymers, such as those offered commercially with acrylic acid esters and acrylic acid amides as the third monomer building block, for example under the designation Aquaflex® SF 40.

Particularly preferred in the hair treatment compositions of the present disclosure are cationic polymers selected from guar hydroxypropyltrimonium chloride, polyquaternium-10, polyquatemium-11, polyquaternium-16, polyquatemium-37, polyquaternium-67, polyquatemium-74, and/or polyquaternium-89. Polyquatemium-16 is particularly preferred.

In a further preferred embodiment, the hair treatment compositions as contemplated herein contain in the water phase (I)—based on the total weight of the water phase (I)—about 0.01 to about 1.0% by weight of at least one cationic surfactant and about 0.01 to about 2.5% by weight of at least one cationic polymer.

Suitable protein hydrolysates (PH) for use in the hair treatment compositions of the present disclosure are understood to be PH of plant as well as animal, marine, or synthetic origin.

Preferred animal protein hydrolysates include elastin, collagen, keratin, silk, and milk protein hydrolysates, which may also be in the form of salts. Such products are marketed, for example, under the trademarks Dehylan® (Cognis), Promois® (Interorgana), Collapuron® (Cognis), Nutrilan® (Cognis), Gelika-Sol® (Deutsche Gelatine Fabriken Stoess & Co), Lexein® (Inolex), and Kerasol® (Croda).

Preferred vegetable protein hydrolysates include soy, almond, pea, potato, and wheat protein hydrolysates. Such products are available, for example, under the trademarks Gluadin® (Cognis), DiaMin® (Diamalt), Lexein® (Inolex), Hydrosoy® (Croda), Hydrolupin® (Croda), Hydrosesame® (Croda), Hydrotritium® (Croda), and Crotein® (Croda).

Suitable protein hydrolysates of marine origin include, for example, collagen hydrolysates from fish or algae as well as protein hydrolysates from mussels or pearl hydrolysates. Examples of suitable pearl hydrolysates as contemplated herein are the commercial products Pearl Protein Extract BG® or Crodarom® Pearl.

Suitable cationized protein hydrolysates can also be of animal, plant, or marine origin.

Quaternization of protein hydrolysates or amino acids can be carried out with quaternary ammonium salts such as N,N-dimethyl-N-(n-alkyl)-N-(2-hydroxy-3-chloro-n-propyl)-ammonium halides. In addition, the cationic protein hydrmlysates may also be further derivatized.

Typical examples of particularly suitable cationic protein hydrolysates and/or their derivatives are the products known under the INCI designations and commercially available: Cocodimonium Hydroxypropyl Hydrolyzed Collagen, Cocodimopnium Hydroxypropyl Hydrolyzed Casein, Cocodimonium Hydroxypropyl Hydrolyzed Collagen, Cocodimonium Hydroxypropyl Hydrolyzed Hair Keratin, Cocodimonium Hydroxypropyl Hydrolyzed Keratin, Cocodimonium Hydroxypropyl Hydrolyzed Rice Protein, Cocodimonium Hydroxypropyl Hydrolyzed Silk, Cocodimonium Hydroxypropyl Hydrolyzed Soy Protein, Cocodimonium Hydroxypropyl Hydrolyzed Wheat Protein, Cocodimonium Hydroxypropyl Silk Amino Acids, Hydroxypropyl Arginine Lauryl/Myristyl Ether HCl, Hydroxypropyltrimonium Gelatin, Hydroxypropyltrimonium Hydrolyzed Casein, Hydroxypropyltrimonium Hydrolyzed Collagen, Hydroxypropyltrimonium Hydrolyzed Conchiolin Protein, Hydroxypropyltrimonium Hydrolyzed keratin, Hydroxypropyltrimonium Hydrolyzed Rice Bran Protein, Hydroxyproypltrimonium Hydrolyzed Silk, Hydroxypropyltrimonium Hydrolyzed Soy Protein, Hydroxypropyl Hydrolyzed Vegetable Protein, Hydroxypropyltrimonium Hydrolyzed Wheat Protein, Hydroxypropyltrimonium Hydrolyzed Wheat Protein/Siloxysilicate, Laurdimonium Hydroxypropyl Hydrolyzed Soy Protein, Laurdimonium Hydroxypropyl Hydrolyzed Wheat Protein, Laurdimonium Hydroxypropyl Hydrolyzed Wheat Protein/Siloxysilicate, Lauryldimonium Hydroxypropyl Hydrolyzed Casein, Lauryldimonium Hydroxypropyl Hydrolyzed Collagen, Lauryldimonium Hydroxypropyl Hydrolyzed Keratin. Lauryldimonium Hydroxypropyl Hydrolyzed Silk, Lauryldimonium Hydroxypopyl Hydrolyzed Soy Protein, Steardimonium Hydroxypropyl Hydrolyzed Casein, Steardimonium Hydroxypropyl Hydrolyzed Collagen, Steardimonium Hydroxypropyl Hydrolyzed Keratin, Steardimonium Hydroxypropyl Hydrolyzed Rice Protein, Steardimonium Hydroxypropyl Hydrolyzed Silk, Steardimonium Hydroxypropyl Hydrolyzed Soy Protein, Steardimonium Hydroxypropyl Hydrolyzed Vegetable Protein, Steardimonium Hydroxypropyl Hydrolyzed Wheat Protein, Steartrimonium Hydroxyethyl Hydrolyzed Collagen, Quaternium-76 Hydrolyzed Collagen, Quaternium-79 Hydrolyzed Collagen, Quatemium-79 Hydrolyzed Keratin, Quaternium-79 Hydrolyzed Milk Protein, Quaternium-79 Hydrolyzed Silk, Quaternium-79 Hydrolyzed Soy Protein, and Quaternium-79 Hydrolyzed Wheat Protein.

Particularly preferred for use in the hair treatment compositions of the present disclosure are keratin, silk, milk protein, wheat, and/or soy protein hydrolysates, which may be quaternized. Keratin and/or wheat and/or silk protein hydrolysates, which may be quaternized, are particularly preferred.

The—optionally quaternized—protein hydrolysates can be used in the hair treatment compositions of the present disclosure both individually and as a mixture.

It may be advantageous for some embodiments of the present disclosure if the hair treatment compositions comprise at least one protein hydrolysate of animal or plant origin, and at least one quaternized protein hydrolysate of animal or plant origin.

The protein hydrolysates and/or quaternized protein hydrolysates may be present in the water phase (I) of the hair treatment compositions as contemplated herein—based on the total weight of the water phase (I)—preferably in amounts of from about 0.001 to about 5% by weight, preferably from about 0.0025 to about 2.5% by weight, and in amounts of from about 0.005 to about 1% by weight.

Suitable vitamins for use in the hair treatment compositions of the present disclosure are understood to be vitamins, provitamins, and vitamin precursors as well as their derivatives from the groups A, B, C, E. F and H.

The group of substances known as vitamin A includes retinol (vitamin $A_1$) and 3,4-didehydroretinol (vitamin $A_2$). The β-carotene is the provitamin of retinol. Examples of vitamin A components include vitamin A acid and its esters, vitamin A aldehyde and vitamin A alcohol, and its esters such as palmitate and acetate. The hair treatment compositions may preferably contain the vitamin A component in amounts of about 0.005-about 1% by weight, based on the total composition.

The vitamin B group or complex includes, among others:
Vitamin $B_1$ (Thiamine),
Vitamin $B_2$ (Riboflavin), and
Vitamin $B_3$. The compounds nicotinic acid and nicotinamide (niacinamide) are frequently listed under this designation. Preferably, the nicotinic acid amide, which may be present in the hair treatment compositions in amounts of about 0.005 to about 1% by weight, based on the total composition,
Vitamin $B_5$ (pantothenic acid, panthenol and pantolactone). Within this group, the panthenol and/or pantolactone is preferred. Usable derivatives of panthenol are the esters and ethers of panthenol as well as cationically derivatized panthenols. Individual representatives include panthenol triacetate, panthenol monoethyl ether and its monoacetate as well as cationic panthenol derivatives. The above-mentioned compounds of the vitamin $B_5$ type may preferably be present in the hair treatment compositions in amounts of about 0.05-about 5% by weight, based on the total composition. Amounts of about 0.1-about 2 wt. % are particularly preferred,
Vitamin $B_6$ (pyridoxine as well as pyridoxamine and pyridoxal),
Vitamin $B_7$—cf. vitamin H.
Vitamin C (Ascorbic acid). Vitamin C can preferably be used in the hair treatment compositions in amounts of about 0.01 to about 3% by weight, based on the total composition. Use in the form of the palmitic acid ester, glucosides or phosphates may be preferred. Use in combination with tocopherols may also be preferred.

Vitamin E (tocopherols, especially α-tocopherol). Tocopherol and its derivatives, which include the esters such as the acetate, the nicotinate, the phosphate, and the succinate, may preferably be present in the hair treatment compositions in amounts of about 0.005-about 1% by weight, based on the total composition.

Vitamin F. The term "vitamin F" usually refers to essential fatty acids, especially linoleic acid, linolenic acid, and arachidonic acid.

Vitamin H. The compound (3aS,4S,6aR)-2-oxohexahydrothienol[3,4-d]imidazole-4-valeric acid is called vitamin H, but in the meantime the trivial name biotin has become established. Biotin may preferably be present in the hair treatment compositions in amounts of about 0.0001 to about 1.0% by weight, such as in amounts of about 0.001 to about 0.01% by weight.

Particularly preferably, the hair treatment compositions as contemplated herein may contain vitamins, provitamins, and vitamin precursors from groups A, B, E and H. Panthenol, pantolactone, pyridoxine and its derivatives, as well as nicotinamide and biotin are particularly preferred and can be added to the hair conditioners as contemplated herein both individually and in their combination in the amounts mentioned above.

Active ingredients for pH regulation which are suitable for use in the hair treatment compositions as contemplated herein are preferably understood to be acids such as, in particular, acetic acid, citric acid, malic acid, maleic acid, formic acid, amidosulfonic acid, phosphoric acid, phosphonic acids, D-lactic acid, L-lactic acid, D/L-lactic acid, oxalic acid, or from the group of alkalis, such as, in particular, sodium hydroxide solution, advantageously in amounts of about 0.01-about 10 wt.-%, preferably from about 0.01 to about 5 wt.-% and, in particular, about 0.01 to about 2 wt.-% (based on the total weight of the hair treatment composition). %, preferably from about 0.01 to about 5% by weight, and about 0.01 to about 2% by weight (based on the total weight of the hair treatment composition).

Preferably, active ingredients for pH regulation are used in the hair treatment compositions of the present disclosure which, in addition to their function of pH adjustment, can further ensure positive properties on the hair and/or scalp. In this context, lactic acid should be mentioned, because it can serve to support skin moisture regulation on the scalp and contribute to color protection on possibly dyed hair.

It has been found that it is advantageous for particularly good stability of the two phases (I) and (II) of the hair treatment composition as contemplated herein if they contain only certain surfactants and/or emulsifiers in specific amounts.

"Stability" in this context means that the two phases separate again quickly after mixing and form a sharp horizontal phase boundary at which optimally no turbidity occurs over a long period of time and with temperature fluctuations.

Surfactants and/or emulsifiers which excessively promote emulsification and/or suspension of the oil phase in the water phase or vice versa are consequently not suitable for use in the compositions as contemplated herein.

Furthermore, foam formation is undesirable when the hair treatment composition as contemplated herein is shaken immediately before use, which is why surfactants/emulsifiers that tend to form strong foam are also excluded.

In a preferred embodiment, the hair treatment compositions as contemplated herein contain a maximum of 1% by weight, more preferably a maximum of 0.8% by weight, particularly preferably a maximum of 0.6% by weight, and in particular a maximum of 0.5% by weight of anionic, amphoteric, zwitterionic, and/or nonionic surfactants and/or emulsifiers (based on the total weight of the hair treatment composition).

Within this embodiment, it is particularly preferred if the hair treatment compositions as contemplated herein do not contain any further anionic, amphoteric, zwitterionic, and/or nonionic surfactants and/or emulsifiers.

Furthermore, it was observed that the presence of various oily and fatty substances can complicate the segregation of the two phases (I) and (II) after their homogenization.

Hair treatment compositions as contemplated herein which, in addition to the essential and optional ingredients already described, contain in their oil phase (II) a maximum of 0.5% by weight, particularly preferably a maximum of 0.3% by weight, and especially a maximum of 0.1% by weight, of further oil and/or fatty substances (based on the oil phase (II)) are therefore of advantage.

Optimally, the hair treatment compositions as contemplated herein do not contain any further oil and/or fatty substances, in particular no fatty alcohols, in addition to the components of the oil phase (II) described earlier in this application.

In another preferred embodiment, hair treatment compositions as contemplated herein are substantially free of fatty alcohols.

By "essentially free" it is understood that the hair treatment compositions as contemplated herein contain—based on their total weight—a maximum of 0.05% by weight, particularly preferably a maximum of 0.01% by weight, and especially 0% by weight of fatty alcohols.

Perfume oils are not to be counted among the oils and fatty substances in this context. These can be used in the oil phase preferably in an amount of up to 5% by weight, more preferably 4% by weight, particularly preferably 3% by weight, and especially 2% by weight (based on the total weight of the oil phase).

Furthermore, the hair treatment compositions as contemplated herein may contain further active ingredients, auxiliaries, and additives, such as, for example:
  Structural agents such as maleic acid,
  Dyes for staining the agent,
  Anti-dandruff active ingredients such as Piroctone Olamine, Zinc Omadine, and Climbazole,
  Cholesterol,
  Complexing agents such as EDTA, NTA, D-alaninediacetic acid and phosphonic acids,
  Pigments,
  Antioxidants and/or UV filters,
  amphoteric, anionic and/or anionic polymers,
  Plant extracts, and
  Penetration aids and/or swelling agents such as urea, hydantoin, and/or their derivatives.

The hair conditioners as contemplated herein preferably have a pH in the range from about 2 to about 7, preferably from about 2.5 to about 6, and from about 3 to about 4.

In addition to an aesthetic appearance, the biphasic hair treatment compositions as contemplated herein have the advantage of being easy to handle and simple to manufacture. The special combination of active ingredients in the hair treatment products ensures rapid mixing of the two phases before application and rapid segregation of the two phases after application. The hydrophilic phase is predominantly water-based, which meets consumer needs. Furthermore, the hair treatment compositions as contemplated herein are particularly suitable for the care of hair. The presence of (cyclic) silicones is not required for either the stability or the conditioning properties of the hair treatment compositions, because the hair treatment compositions as contemplated herein exhibit comparably good conditioning advantages on hair treated therewith compared to compositions containing silicones. Hair shine and styling properties, especially of previously stressed and/or damaged hair, were significantly improved. But the "anti-frizz" effect of such hair treatment products was also given an excellent rating in a consumer test. The hair treatment compositions as contemplated herein are sprayable and suitable for application from a pump dispenser. This makes them easy to use and effective in their action, because the fine spray that comes out of the pump dispenser reaches all areas of the hair.

A second object of the present disclosure is a method for conditioning hair, in which a hair treatment composition as contemplated herein is applied (preferably sprayed) to wet or dry hair after vigorous shaking and is left on the hair until the next hair cleaning.

A third object of the present disclosure is a method for the use of the hair treatment composition of the present disclosure to improve:
  the wet and/or dry combability,
  the hair feeling to the tips (in wet and dry hair),
  the grip of the hair,
  the style ability/shaping of the hairstyle,
  the anti-frizz properties,
  the suppleness of hair,
  the hair shine, and/or
  the static charge of hair.

What has been said about the composition as contemplated herein applies to the method and use as contemplated herein.

The following examples are intended to describe the objects of the present disclosure in more detail, without limiting them thereto.

EXAMPLES

The following two-phase hair treatment compositions as contemplated herein were prepared by the following method (the quantities indicated in bold refer to [wt %] of the oil phase and the water phase in the total hair care composition; the quantities not indicated in bold refer to [wt %] of the active ingredients based on the weight of the oil phase and based on the weight of the water phase, respectively):

Water was mixed with other excipients and active ingredients, if necessary, and homogenized, resulting in a clear solution. Subsequently, the oil phase components (i) to (iii) and, if necessary, a perfume were mixed and homogenized. Subsequently, the water phase (I) and the oil phase (II) were combined and homogenized (stirring for 3 minutes at 3500 rpm). The weight ratio of the two phases (I) to (II) was particularly preferably 88:12.

The hair care products were filled into preferably transparent containers, particularly preferably into transparent pump dispensers.

In the resting state, the hair care products exhibited two separate, visually discernible continuous phases with a common horizontal phase boundary.

| | 1 | 2 | 3 | 4 |
|---|---|---|---|---|
| Oil phase | ≤20 | ≤18 | ≤15 | ≤12 |
| Isoparaffin with 9 to 17 carbon atoms | 20-40 | 22-38 | 25-35 | 27-33 |
| two different esters ii) | 45-65 | 48-63 | 50-61 | 52-60 |
| Vegetable oil | 5-20 | 6-17 | 7-15 | 8-12 |
| Water phase | ≥80 | ≥82 | ≥85 | ≥88 |
| Water and, if necessary, other auxiliaries and active ingredients | ≥80 | ≥82 | ≥85 | ≥88 |

| | 5 | 6 | 7 | 8 |
|---|---|---|---|---|
| Oil phase | ≤20 | ≤18 | ≤15 | ≤12 |
| isodecane, isoundecane, isododecane, isotridecane, isotetradecane and mixtures thereof | 20-40 | 22-38 | 25-35 | 27-33 |
| two different esters ii) | 45-65 | 48-63 | 50-61 | 52-60 |
| Vegetable oil | 5-20 | 6-17 | 7-15 | 8-12 |
| Water phase | ≥80 | ≥82 | ≥85 | ≥88 |
| Water and, if necessary, other auxiliaries and active ingredients | ≥80 | ≥82 | ≥85 | ≥88 |

| | 9 | 10 | 11 | 12 |
|---|---|---|---|---|
| Oil phase | ≤20 | ≤18 | ≤15 | ≤12 |
| Isoundecane, isododecane, isotridecane and mixtures thereof | 20-40 | 22-38 | 25-35 | 27-33 |
| two different esters ii) | 45-65 | 48-63 | 50-61 | 52-60 |
| Vegetable oil | 5-20 | 6-17 | 7-15 | 8-12 |
| Water phase | ≥80 | ≥82 | ≥85 | ≥88 |
| Water and, if necessary, other auxiliaries and active ingredients | ≥80 | ≥82 | ≥85 | ≥88 |

| | 13 | 14 | 15 | 16 |
|---|---|---|---|---|
| Oil phase | ≤20 | ≤18 | ≤15 | ≤12 |
| Isoparaffin with 9 to 17 carbon atoms | 20-40 | 22-38 | 25-35 | 27-33 |
| Neopentyl Polyol Polyester | 10-60 | 15-57.5 | 20-55 | 25-52.5 |
| ester of a cross-linked $C_5$-$C_8$ carboxylic acid and a $C_{12}$-$C_{24}$ monoalcohol | 5-20 | 6-17 | 7-15 | 8-12 |
| Vegetable oil | 5-20 | 6-17 | 7-15 | 8-12 |
| Water phase | ≥80 | ≥82 | ≥85 | ≥88 |
| Water and, if necessary, other auxiliaries and active ingredients | ≥80 | ≥82 | ≥85 | ≥88 |

| | 17 | 18 | 19 | 20 |
|---|---|---|---|---|
| Oil phase | ≤20 | ≤18 | ≤15 | ≤12 |
| Isoparaffin with 9 to 17 carbon atoms | 20-40 | 22-38 | 25-35 | 27-33 |
| Neopentyl Glycol Polyester | 10-60 | 15-57.5 | 20-55 | 25-52.5 |
| Esters of 2-ethylhexylcarboxylic acid and myristyl, cetyl and/or stearyl alcohols | 5-20 | 6-17 | 7-15 | 8-12 |
| Vegetable oil | 5-20 | 6-17 | 7-15 | 8-12 |
| Water phase | ≥80 | ≥82 | ≥85 | ≥88 |
| Water and, if necessary, other auxiliaries and active ingredients | ≥80 | ≥82 | ≥85 | ≥88 |

| | 21 | 22 | 23 | 24 |
|---|---|---|---|---|
| Oil phase | ≤20 | ≤18 | ≤15 | ≤12 |
| Isoundecane, isododecane, isotridecane and mixtures thereof | 20-40 | 22-38 | 25-35 | 27-33 |
| Neopentyl Polyol Polyester | 10-60 | 15-57.5 | 20-55 | 25-52.5 |
| ester of a cross-linked $C_5$-$C_8$ carboxylic acid and a $C_{12}$-$C_{24}$ monoalcohol | 5-20 | 6-17 | 7-15 | 8-12 |
| Vegetable oil | 5-20 | 6-17 | 7-15 | 8-12 |
| Water phase | ≥80 | ≥82 | ≥85 | ≥88 |
| Water and, if necessary, other auxiliaries and active ingredients | ≥80 | ≥82 | ≥85 | ≥88 |

| | 25 | 26 | 27 | 28 |
|---|---|---|---|---|
| Oil phase | ≤20 | ≤18 | ≤15 | ≤12 |
| Isoparaffin with 9 to 17 carbon atoms | 20-40 | 22-38 | 25-35 | 27-33 |
| Neopentyl Polyol Polyester | 10-60 | 15-57.5 | 20-55 | 25-52.5 |
| ester of a cross-linked $C_5$-$C_8$ carboxylic acid and a $C_{12}$-$C_{24}$ monoalcohol | 5-20 | 6-17 | 7-15 | 8-12 |
| Avocado oil, sea buckthorn fruit oil and/or macadamia nut oil | 5-20 | 6-17 | 7-15 | 8-12 |
| Water phase | ≥80 | ≥82 | ≥85 | ≥88 |
| Water and, if necessary, other auxiliaries and active ingredients | ≥80 | ≥82 | ≥85 | ≥88 |

|  | 29 | 30 | 31 | 32 |
|---|---|---|---|---|
| Oil phase | ≤20 | ≤18 | ≤15 | ≤12 |
| Isoparaffin with 9 to 17 carbon atoms | 20-40 | 22-38 | 25-35 | 27-33 |
| Neopentyl Polyol Polyester | 10-60 | 15-57.5 | 20-55 | 25-52.5 |
| ester of a cross-linked $C_5$-$C_8$ carboxylic acid and a $C_{12}$-$C_{24}$ monoalcohol | 5-20 | 6-17 | 7-15 | 8-12 |
| Macadamia nut oil | 5-20 | 6-17 | 7-15 | 8-12 |
| Water phase | ≥80 | ≥82 | ≥85 | ≥88 |
| Water and, if necessary, other auxiliaries and active ingredients | ≥80 | ≥82 | ≥85 | ≥88 |

|  | 33 | 34 | 35 | 36 |
|---|---|---|---|---|
| Oil phase | ≤20 | ≤18 | ≤15 | ≤12 |
| Isoundecane, isododecane, isotridecane and mixtures thereof | 20-40 | 22-38 | 25-35 | 27-33 |
| Neopentyl Polyol Polyester | 10-60 | 15-57.5 | 20-55 | 25-52.5 |
| ester of a cross-linked $C_5$-$C_8$ carboxylic acid and a $C_{12}$-$C_{24}$ monoalcohol | 5-20 | 6-17 | 7-15 | 8-12 |
| Avocado oil, sea buckthorn fruit oil and/or macadamia nut oil | 5-20 | 6-17 | 7-15 | 8-12 |
| Water phase | ≥80 | ≥82 | ≥85 | ≥88 |
| Water and, if necessary, other auxiliaries and active ingredients | ≥80 | ≥82 | ≥85 | ≥88 |

|  | 37 | 38 | 39 | 40 |
|---|---|---|---|---|
| Oil phase | ≤20 | ≤18 | ≤15 | ≤12 |
| isodecane, isoundecane, isododecane, isotridecane, isotetradecane and mixtures thereof | 20-40 | 22-38 | 25-35 | 27-33 |
| two different esters ii) | 45-65 | 48-63 | 50-61 | 52-60 |
| Vegetable oil | 5-20 | 6-17 | 7-15 | 8-12 |
| Water phase | ≥80 | ≥82 | ≥85 | ≥88 |
| Water and, if necessary, other auxiliaries and active ingredients | ≥80 | ≥82 | ≥85 | ≥88 |
| Cationic surfactant | 0.01-1.0 | 0.05-0.8 | 0.075-0.6 | 0.10-0.5 |

|  | 41 | 42 | 43 | 44 |
|---|---|---|---|---|
| Oil phase | ≤20 | ≤18 | ≤15 | ≤12 |
| isodecane, isoundecane, isododecane, isotridecane, isotetradecane and mixtures thereof | 20-40 | 22-38 | 25-35 | 27-33 |
| two different esters ii) | 45-65 | 48-63 | 50-61 | 52-60 |
| Vegetable oil | 5-20 | 6-17 | 7-15 | 8-12 |
| Water phase | ≥80 | ≥82 | ≥85 | ≥88 |
| Water and, if necessary, other auxiliaries and active ingredients | ≥80 | ≥82 | ≥85 | ≥88 |
| Cetrimonium chloride and/or behentrimonium chloride | 0.01-1.0 | 0.05-0.8 | 0.075-0.6 | 0.10-0.5 |

|  | 45 | 46 | 47 | 48 |
|---|---|---|---|---|
| Oil phase | ≤20 | ≤18 | ≤15 | ≤12 |
| isodecane, isoundecane, isododecane, isotridecane, isotetradecane and mixtures thereof | 20-40 | 22-38 | 25-35 | 27-33 |
| two different esters ii) | 45-65 | 48-63 | 50-61 | 52-60 |
| Vegetable oil | 5-20 | 6-17 | 7-15 | 8-12 |
| Water phase | ≥80 | ≥82 | ≥85 | ≥88 |
| Water and, if necessary, other auxiliaries and active ingredients | ≥80 | ≥82 | ≥85 | ≥88 |
| Cationic polymer | 0.01-2.5 | 0.05-2.0 | 0.10-1.5 | 0.20-1.0 |

|  | 49 | 50 | 51 | 52 |
|---|---|---|---|---|
| Oil phase | ≤20 | ≤18 | ≤15 | ≤12 |
| isodecane, isoundecane, isododecane, isotridecane, isotetradecane and mixtures thereof | 20-40 | 22-38 | 25-35 | 27-33 |
| two different esters ii) | 45-65 | 48-63 | 50-61 | 52-60 |
| Vegetable oil | 5-20 | 6-17 | 7-15 | 8-12 |
| Water phase | ≥80 | ≥82 | ≥85 | ≥88 |
| Water and, if necessary, other auxiliaries and active ingredients | ≥80 | ≥82 | ≥85 | ≥88 |
| Polyquaternium-16 | 0.01-2.5 | 0.05-2.0 | 0.10-1.5 | 0.20-1.0 |

|  | 53 | 54 | 55 | 56 |
|---|---|---|---|---|
| Oil phase | ≤20 | ≤18 | ≤15 | ≤12 |
| isodecane, isoundecane, isododecane, isotridecane, isotetradecane and mixtures thereof | 20-40 | 22-38 | 25-35 | 27-33 |
| two different esters ii) | 45-65 | 48-63 | 50-61 | 52-60 |
| Vegetable oil | 5-20 | 6-17 | 7-15 | 8-12 |
| Water phase | ≥80 | ≥82 | ≥85 | ≥88 |
| Water and, if necessary, other auxiliaries and active ingredients | ≥80 | ≥82 | ≥85 | ≥88 |
| Cationic polymer | 0.01-2.5 | 0.05-2.0 | 0.10-1.5 | 0.20-1.0 |
| Cationic surfactant | 0.01-1.0 | 0.05-0.8 | 0.075-0.6 | 0.10-0.5 |

|  | 57 | 58 | 59 | 60 |
|---|---|---|---|---|
| Oil phase | ≤20 | ≤18 | ≤15 | ≤12 |
| Isoundecane, isododecane, isotridecane and mixtures thereof | 20-40 | 22-38 | 25-35 | 27-33 |
| Neopentyl Polyol Polyester | 10-60 | 15-57.5 | 20-55 | 25-52.5 |
| ester of a cross-linked $C_5$-$C_8$ carboxylic acid and a $C_{12}$-$C_{24}$ monoalcohol | 5-20 | 6-17 | 7-15 | 8-12 |
| Avocado oil, sea buckthorn fruit oil and/or macadamia nut oil | 5-20 | 6-17 | 7-15 | 8-12 |

-continued

|  | | | | |
|---|---|---|---|---|
| Water phase | ≥80 | ≥82 | ≥85 | ≥88 |
| Water and, if necessary, other auxiliaries and active ingredients | ≥80 | ≥82 | ≥85 | ≥88 |
| Cationic polymer | 0.01-2.5 | 0.05-2.0 | 0.10-1.5 | 0.20-1.0 |
| Cationic surfactant | 0.01-1.0 | 0.05-0.8 | 0.075-0.6 | 0.10-0.5 |

Furthermore, compositions (I) and (II) as contemplated herein and a comparative composition (III) were prepared.

composition (I) as contemplated herein was compared with the prior art silicone-containing composition (III). The quantities refer to % by weight (in the total composition):

|  | (I) | (II) | (III) |
|---|---|---|---|
| Oil phase | | | |
| LexFeel ®[1] D5 | 9.00 | 9.00 | |
| Schercemol ®[2] CO Ester | 1.00 | 1.00 | |
| Cetil ®[3] CC | | | 1.00 |
| Macadamia nut oil | 1.00 | 1.00 | |
| Perfume | 0.25 | 0.25 | 0.25 |
| Phenyl Trimethicone | | | 1.00 |
| DC 1501 ®[4] | | | 4.50 |
| Cyclopentasiloxane | | | 3.00 |
| Microcare Silicone ®[5] E1016 | | | 0.50 |
| Water phase | | | |
| Cetrimonium Chloride | 0.15 | 0.15 | 0.15 |
| Polyquaternium-16 | 0.40 | 0.40 | 0.40 |
| Panthenol | 0.20 | 0.20 | 0.20 |
| Water, active ingredients for pH regulation (pH 4), preservatives, colorants | ad 100 | ad 100 | ad 100 |

®[1]INCI designation: Neopentyl Glycol Diheptanoate, Isododecane (Inolex)
®[2]INCI designation: Cetyl Erhylhexanoate (Lubrizol)
®[3]INCI designation: Dicaprylyl Carbonate (BASF)
®[4]INCI designation: Cyclomethicone, Dimethiconol (Dow Corning)
®[5]INCI designation: Cetyl PEG/PPG-10/1 Dimethicone (Thor)

In a test, the two compositions were evaluated by subjects on a range of product and care properties (consistency of product; spread ability; odor; tangibility of wet hair; combability of wet and dry hair; hair feel of wet and dry hair; moldability/style ability; hair feel of ends; static charge; shine; fullness of hair; degree of conditioning; softness of hair; smoothness of hair; moisture; over conditioning; build up; overall rating).

The two products were neutrally packaged and coded, applied in equal amounts to three models in a half-side test, and evaluated by an expert.

The smooth, untreated hair of models 1 and 2 exhibited normal (healthy) hair and scalp condition, as well as medium density and medium hair diameter.

The bleached hairs of model 3 were porous, of lower density and smaller hair diameter.

The grades 1 to 6 (where 1 stood for poor and 6 for particularly good) could be assigned.

The evaluation showed that the composition (I) as contemplated herein was rated about the same as the composition (III) in almost all the previously mentioned categories.

Particularly about shaping/style ability and gloss, as well as in the overall evaluation, the composition (I) as contemplated herein was rated better than the silicone-containing comparative composition (III).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A hair treatment composition in the form of a two-phase system having two separate, optically detectable continuous phases with a common horizontal phase boundary, comprising a water phase (I) and an oil phase (II), wherein
   the oil phase (II) is a mixture of:
   i) an isoparaffin having 9 to 17 carbon atoms, wherein the isoparaffin is present in the oil phase (II) in an amount of from about 25 to about 35 weight percent, based on a total weight of the oil phase (II),
   ii) at least two different mono- and/or diesters of linear or branched, saturated or unsaturated $C_4$-$C_{12}$ carboxylic acids with linear or branched, saturated or unsaturated $C_4$-$C_{24}$ mono- or dialcohols, and
   iii) a vegetable oil, and
   the hair treatment composition is essentially free of silicone compounds.

2. The hair treatment composition according to claim 1, wherein
   the water phase (I) is present in a proportion by weight of at least about 80% of the total weight of the hair treatment composition, and
   the oil phase (II) is present in a proportion by weight of not more than about 20% by weight of the total weight of the hair treatment composition.

3. The hair treatment composition according to claim 1, comprising in the oil phase (II), based on its total weight,
   from about 27 to about 33 percent by weight of the isoparaffin i),
   from about 45 to about 65% by weight of the at least two different mono- and/or diesters ii), and
   from about 5 to about 20% by weight of the vegetable oil iii).

4. The hair treatment composition according to claim 1, wherein the isoparaffin i) is selected from the group consisting of isodecane, isoundecane, isododecane, isotridecane, isotetradecane and mixtures thereof.

5. The hair treatment composition according to claim 1, wherein the isoparaffin i) is selected from the group consisting of isoundecane, isododecane, isotridecane, or a combination thereof.

6. The hair treatment composition according to claim 1, wherein the at least two different esters ii) comprise branched esters, wherein the branching is in in an alcohol residue or in an acid residue.

7. The hair treatment composition according to claim 6, comprising:
   at least one neopentyl polyol polyester, and
   at least one ester of a crosslinked $C_5$-$C_8$ carboxylic acid and a $C_{12}$-$C_{24}$ monoalcohol.

8. The hair treatment composition according to claim 1, wherein the vegetable oil iii) comprises macadamia nut oil.

9. The hair treatment composition according to claim 1, comprising in the water phase (I), based on its total weight, from about 0.01 to about 2.5% by weight of at least one cationic polymer.

10. The hair treatment composition according to claim 1, comprising in the water phase (I), based on its total weight, from about 0.01 to about 1.0% by weight of at least one cationic surfactant.

11. The hair treatment composition according to claim 1, comprising in the water phase (I), based on its total weight, greater than 85% by weight of water.

12. The hair treatment composition according to claim 1, wherein the hair treatment composition is substantially free of fatty alcohols.

13. The hair treatment composition according to claim 1, wherein the water phase (I) and the oil phase (II) each have a viscosity of less than 1000 mPas, measured at 20° C. with a Brookfield viscometer DV-II, spindle 2, 20 rpm.

14. The hair treatment composition according to claim 1, wherein
the water phase (I) is present in a proportion by weight of at least about 88% of the total weight of the hair treatment composition, and
the oil phase (II) is present in a proportion by weight of not more than about 12% by weight of the total weight of the hair treatment composition.

15. The hair treatment composition according to claim 6, comprising:
a neopentyl glycol diester, and
at least one ester of 2-ethylhexyl carboxylic acid and myristyl, cetyl and/or stearyl alcohol.

16. The hair treatment composition according to claim 1, comprising in the water phase (I), based on its total weight, greater than 95% by weight of water.

17. The hair treatment composition according to claim 1, wherein the water phase (I) and the oil phase (II) each have a viscosity of less than 500 mPas, measured at 20° C. with a Brookfield viscometer DV-II, spindle 2, 20 rpm.

* * * * *